United States Patent [19]
Maier et al.

[11] 3,944,068
[45] Mar. 16, 1976

[54] FASTENING ELEMENT HOLDER STRIP WITH BREAK-OFF LOCATIONS

[75] Inventors: Elmar Maier, Feldkirch-Tisis, Austria; Robert Tilg, Schaan, Liechtenstein

[73] Assignee: Hilti Aktiengesellschaft, Schaan, Liechtenstein

[22] Filed: Oct. 2, 1974

[21] Appl. No.: 511,261

Related U.S. Application Data

[63] Continuation-in-part of Ser. No. 355,660, April 30, 1975, Pat. No. 3,904,032, which is a continuation of Ser. No. 174,846, Aug. 25, 1971, abandoned.

[30] Foreign Application Priority Data

Oct. 8, 1973 Germany............................ 2350433

[52] U.S. Cl. ................................ 206/347; 85/10 E
[51] Int. Cl.² ................... B65D 85/24; F16B 15/08
[58] Field of Search ............................ 206/347, 346

[56] References Cited
UNITED STATES PATENTS

| | | | |
|---|---|---|---|
| 226,818 | 4/1880 | Woodward et al. ............ | 206/347 X |
| 2,784,405 | 3/1957 | Working, Jr. ...................... | 206/346 |
| 3,438,487 | 4/1969 | Gallee et al......................... | 206/347 |
| 3,841,474 | 10/1974 | Maier................................. | 206/346 |

*Primary Examiner*—Leonard Summer
*Attorney, Agent, or Firm*—Toren, McGeady and Stanger

[57] ABSTRACT

In a strip for holding fastening elements, such as nails and the like, as they are fed into a setting device for insertion into a target material, break-off locations are provided in the strip to separate used portions of the strip from portions still containing fastening elements. The holder strip is an elongated flat tape or belt-like member. The fastening elements are secured within holes spaced apart in the elongated direction of the strip. The fastening elements have transversely extending heads which punch out parts of the strip as the elements are driven into the target material. Preferably, the break-off locations are in the form of notches extending inwardly from the longitudinal sides of the strip into the region punched out by the inserted elements. As a result, when a fastening element punches through the strip where break-off locations are present, at least a portion of the strip from which the fastening elements have been driven is separated from the remainder of the strip.

2 Claims, 1 Drawing Figure

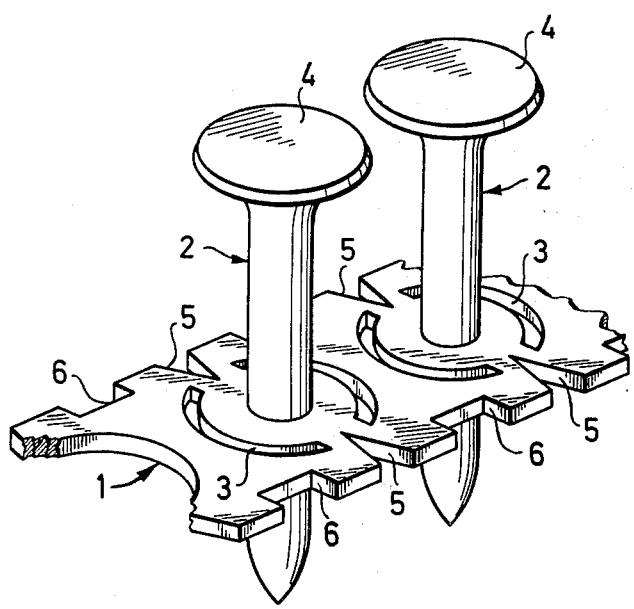

FASTENING ELEMENT HOLDER STRIP WITH BREAK-OFF LOCATIONS

The present invention is a continuation-in-part of application Ser. No. 355,660 filed Apr. 30, 1975 and now U.S. Pat. No. 3,904,032 which issued Sept. 9, 1975 and which, in turn, is a continuation of application Ser. No. 174,846 filed Aug. 25, 1971 and now abandoned.

SUMMARY OF THE INVENTION

The present invention is directed to a holder for feeding fastening elements, such as nails and the like, into a device from which the fastening elements are driven by a piston, and, more particularly, it concerns an improvement in an elongated strip-shaped holder in which the shanks of fastening elements are secured in longitudinally spaced holes and in which the holder is formed of such material and dimensions that the fastening element can punch through the holder when it is driven into the target material. The improvement is directed to the provision of break-off locations in the holder strip so that used portions of the strip can be separated from the remainder of the strip.

In the parent case a magazine or holder strip is loaded with nail-like fastening elements for insertion into a target material by a setting device operated by a powder charge. The fastening elements are inserted or driven in by means of a piston mounted in the setting device and propelled by highly compressed gases generated when the powder charge is ignited. The magazine or holder strip is in the form of an elongated flat tape or belt with the material and thickness of the strip selected so that the head of the fastening element being inserted can punch through the strip due to the force imparted by the piston.

As explained in the parent case, the holder for the fastening elements used in a setting device employing a powder charge driven piston, is associated with certain problems. These problems were solved in the parent case by providing a holder strip which can be punched through by the heads of the fastening elements. The ability of the fastening elements to punch through the holder strip is facilitated by the provision of perforations or cutouts in the strip aligned with the fastening element heads.

This type of fastening element support has worked out very well in practice, due, in particular, to the favorable guiding properties afforded the fastening elements as they are driven into a target material. Because of the considerable functional capabilities provided by this type of fastening element support, the trend is toward the use of longer holder strips containing a great number of fastening elements positioned one after the other. With such an arrangement the number of times a new holder strip must be loaded into the setting device is reduced and the overall time involved in loading and inserting the fastening elements is also reduced.

However, where the overall length of the holder strips has been increased, the portion of the strip from which the fastening elements have been displaced, can have an interfering effect. As an example, especially when the setting device is used in relatively inaccessible locations, the used portion of the holder strip may become entangled and cause considerable difficulty in the handling of the setting device. As a result, it is necessary to cut off the used portions of the holder strip after a certain number of driving cycles have been performed by means of a separate cutting tool. Such a removal operation and the requirement of a separate cutting tool involves lost time in the operation of the setting device.

Therefore, it is a primary object of the present invention, when using a holder strip of the type described in the parent case, to provide a predetermined break-off location which extends from the longitudinal edge of the strip toward the opening holding the fastening element to a position roughly in line with the periphery of the fastening element head.

In accordance with the present invention, a break-off location is provided which projects into the area of the holder strip which is cut out by the fastening element head. As a result, when the fastening element punches out a portion of the holder strip it also separates a portion of the strip which held the fastening element. Instead of elongated portions of the holder strip issuing from the setting device, small portions are cut and fall from the device and the above-mentioned interfering effect is avoided.

To provide a positive separation of the used portions of the strip it is expedient if two predetermined break-off locations are provided symmetrically on opposite sides of the opening holding a fastening element. Preferably, the predetermined break-off locations are provided in the form of inwardly extending notches to assure a clean and positive separation of the used strip portions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The drawing is a perspective view of a portion of a fastening element holder strip embodying the present invention.

DETAILED DESCRIPTION OF THE INVENTION

In the drawing a portion of an elongated holder strip 1 is shown in which fastening elements or nails 2 are positioned within openings formed in the strip. The nails 2 are secured in the strip along their shanks and the laterally extending heads 4 of the nails are spaced from the strip. Two symmetrically arranged perforations or cutouts 3 are provided in the strip spaced radially outwardly from and partly enclosing the opening holding a nail 2. The cutouts 3 are arranged or aligned with the lateral periphery of the nail head 4 so that it is easier to punch out a portion of the strip. In other words, only that portion of the strip which remains between the adjacent ends of the cutouts must be punched through to provide a punched-out portion of the strip. Further, two symetrically disposed V-shaped notches 5 are provided inthe strip each extending inwardly from an opposite longitudinal edge of the strip. The inner portion of the notches is located between the adjacent ends of the cutouts 3 and in the path of the nail head 4 as it passes through the strip during the driving operation. Accordingly, as a nail is driven through the strip it punches out that portion partly defined by the cutouts 3 and also traverses the inner or apex end of the V-shaped notches 5 so that the portion of the strip from which the nail 2 has been driven is removed from the remaining portion which contains nails yet to be driven. As a result, the holder strip 1 is cut into individual small sections as each of the nails 2 are driven from the strip. It can be appreciated that the notches 5 can be provided in different shapes and need not be located at the position of each of the fastening elements.

As can be noted in the drawing, the holder strip has rectangular shaped recesses 6 formed along each of the longitudinally extending edges for engagement with components in the setting device for moving the strip as each fastening element is inserted. Such components in setting devices are known and, therefore, are not shown nor further described.

While a specific embodiment of the invention has been shown and described in detail to illustrate the application of the inventive principles, it will be understood that the invention may be embodied otherwise without departing from such principles.

We claim:

1. A holder assembly for supplying fastening elements into the barrel of a setting device so that the fastening elements can be driven into a target material by means of a piston driven by an explosive force developed within the setting device, the holder assembly includes a flat elongated strip having a plurality of holes therethrough spaced apart in the elongated direction of the strip and a fastening element positioned within each hole, each fastening element includes an elongated shank having a first end and a second end with the first end arranged to be inserted first into the target material and a head extending transversely laterally outwardly from the circumferential periphery of the shank at the second end thereof, the shank of each said fastening element being secured within one of the holes in said holder strip, said holder strip having a width greater than the diameter of the heads of the fastening elements so that the sides of the strip extend laterally outwardly beyond the lateral periphery of the heads, said holder strip being perforated inwardly of the sides of said strip adjacent to and on opposite sides of each hole so that at least a pair of perforations are spaced radially outward relative to the hole with which the perforations are associated, said perforations are separate and spaced from the perforations associated with the adjacent holes, said perforations being aligned with the lateral periphery of the head of said fastening element in the hole with which said perforations are associated and extending in the direction of the lateral periphery of the head, each said perforation having a pair of ends spaced apart in the direction of the lateral periphery of the head of said fastening element with which it is associated, each end of said perforations being spaced apart in the direction of the lateral periphery of the head of the fastening element with which it is associated from an adjacent end of another perforation associated with the hole, said holder strip is formed of a selected material and thickness so that in combination with the perforations formed about each hole a washer-like portion of said strip laterally enclosing the shank of the fastening element can be punched from the strip by the head of the fastening element as it is driven into the target material by the explosive force driven piston in the setting device with the perforations assisting in the punching out of the washer-like portion, wherein the improvement comprises means in said holder strip shaped for providing a pair of break-off locations associated with at least certain of the holes in said holder strip so that as a fastening element positioned within the hole with which the break-off locations are associated, is inserted through the strip into the target material it traverses the break-off locations and provides a separation between a portion of the strip containing the just inserted fastening element from the remaining strip containing the fastening elements to be fed to the setting device, said break-off locations each extending inwardly from an opposite longitudinal edge of the strip to a point at least aligned with the lateral periphery of the head of the fastening element which passes through the strip and located between the adjacent ends of two of said perforations, said means for providing break-off locations comprises a V-shaped notch forming each break-off location with said notch cut through said strip and extending inwardly from the longitudinal edge of the strip transverse to the longitudinal direction of the strip at least to a point in alignment with the lateral periphery of the head of the fastening elements held in the hole with which the break-off location is associated, and the wider portion of the V-shaped notch being located along the longitudinal edge of said strip.

2. A holder assembly, as set forth in claim 1, wherein two said V-shaped notches are arranged at each hole securing a fastening element with the V-shaped notches being located symmetrically on opposite sides of the hole and with the line connecting the apex points of the V-shaped notches passing through the center of the hole with which they are associated.

* * * * *